(12) United States Patent
Noguchi (10) Patent No.: US 8,170,741 B2
(45) Date of Patent: May 1, 2012

(54) VEHICLE AND CONTROLLER FOR VEHICLE AND METHOD FOR DETECTING VEHICLE ABNORMALITY THEREOF

(75) Inventor: Takeharu Noguchi, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 1037 days.

(21) Appl. No.: 12/022,981

(22) Filed: Jan. 30, 2008

(65) Prior Publication Data

US 2008/0183350 A1 Jul. 31, 2008

(30) Foreign Application Priority Data

Jan. 31, 2007 (JP) .................................. 2007-021242
Nov. 22, 2007 (JP) .................................. 2007-302501

(51) Int. Cl.
G01M 17/00 (2006.01)

(52) U.S. Cl. ..................................................... 701/29.1

(58) Field of Classification Search .............. 701/29–30, 701/34, 51, 53, 54, 61, 67, 71, 87, 95, 30.9
See application file for complete search history.

(56) References Cited

U.S. PATENT DOCUMENTS 6,073,072 A * 6/2000 Ishii et al. ........................ 701/63

FOREIGN PATENT DOCUMENTS

| EP | 1710143 A1 | 10/2006 |
| GB | 2321507 A | 7/1998 |
| JP | 10-018896 | 1/1998 |

OTHER PUBLICATIONS

European Search Report for corresponding European application 08250200.6 lists the references above.

\* cited by examiner

Primary Examiner — Kim T Nguyen
(74) Attorney, Agent, or Firm — Rabin & Berdo, PC (57) ABSTRACT

Early detection of an abnormality in a vehicle speed detection system. A continuously variable transmission (CVT) has an input shaft connected to an engine and an output shaft connected to a rear wheel. A change-gear ratio between the input and output shafts is electronically controlled. The vehicle speed detection system outputs a vehicle speed signal. An electronic control unit (ECU) detects an abnormality in the vehicle speed detection system based on at least one of a rotational speed of the engine, a rotational speed of the input shaft, and a rotational speed of the output shaft, as well as based on the vehicle speed signal outputted from the vehicle speed detection system.

21 Claims, 8 Drawing Sheets

VEHICLE AND CONTROLLER FOR VEHICLE AND METHOD FOR DETECTING VEHICLE ABNORMALITY THEREOF

RELATED APPLICATIONS

This application claims the benefit of priority under 35 USC 119 of Japanese patent application no. 2007-021242, filed on Jan. 31, 2007, and Japanese patent application no. 2007-302501, filed on Nov. 22, 2007, which applications are hereby incorporated by reference in their entireties.

BACKGROUND OF THE INVENTION

1. Field of the Invention

The present invention relates to a controller and a method for detecting a vehicle abnormality.

2. Description of Related Art

Various methods for detecting an abnormality of a vehicle speed sensor have been proposed. For example, JP-A-Hei 10-18896 discloses a method for detecting an abnormality of a vehicle speed sensor based on a throttle opening and a vehicle speed detected by the vehicle speed sensor.

Figure 8:
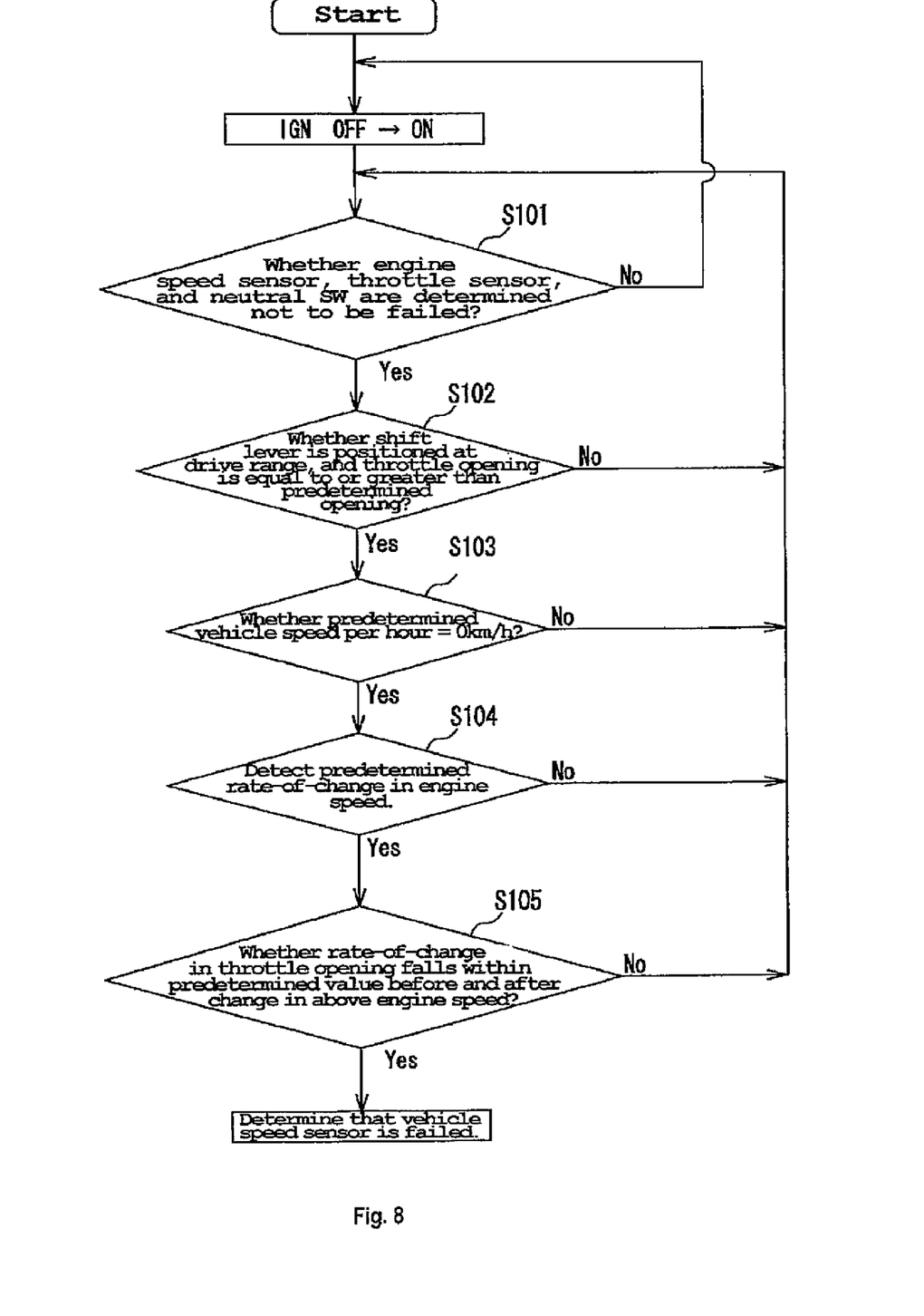
FIG. 8 is a flowchart illustrating a related art method for detecting an abnormality of a vehicle speed sensor.

The method of JP-A-Hei 10-18896 for detecting an abnormality of a vehicle speed sensor is depicted in FIG. 8. and includes a first step S101 of checking whether an engine speed sensor and a throttle opening sensor are normal. If the throttle opening sensor and the like are determined as normal, the method goes to step S102 to determine whether a shift lever is positioned at a drive range, and whether the throttle opening is equal to or greater than a predetermined opening. If the shift lever is positioned at the drive range and the throttle opening is equal to or greater than the predetermined opening, the method goes to step S103 to determine whether the vehicle speed sensor detects a vehicle speed of 0 km/h. If the vehicle speed sensor detects a vehicle speed of 0 km/h, the method goes to step S104 to determine whether the engine speed decreases at a given rate. If the engine speed decreases at a given rate, the method goes to step S105 to determine whether the throttle opening is constant. If the throttle opening is constant, there is determined to be a failure in the vehicle speed sensor and in the wiring connected to the vehicle speed sensor.

According to JP-A-Hei 10-18896, the aforementioned method accurately determines whether there is a failure in the vehicle detection system.

An electronic continuously variable transmission (ECVT) is also known. Generally, in an ECVT-mounted vehicle, a change-gear ratio is controlled based on the vehicle speed and throttle opening. Thus, when an abnormality occurs in the vehicle speed detection system, an improper change-gear ratio may be selected. This may cause difficulty in driving. Therefore, the need for early detection of an abnormality in the vehicle speed detection system of an ECVT-mounted vehicle is intensified.

However, as shown in FIG. 8, unless the throttle opening is equal to or greater than a predetermined opening, no abnormality is detected in the vehicle speed detection system by the method of JP-A-Hei 10-18896. Thus, an abnormality in the vehicle speed detection system is not detected early enough.

SUMMARY OF THE INVENTION

The present invention addresses the foregoing problems and provides a vehicle having an ECVT and that enables early detection of an abnormality in a vehicle speed detection system.

A vehicle according to a first aspect of the invention includes a drive wheel; a driving source for producing a rotational force; a continuously variable transmission (CVT); a vehicle speed detection system; and a control unit. The CVT has an input shaft connected to the driving source and an output shaft connected to the drive wheel. A change-gear ratio between the input and output shafts is electronically controlled. The vehicle speed detection system outputs a vehicle speed signal. The control unit detects an abnormality in the vehicle speed detection system based on at least one of a rotational speed of the driving source, a rotational speed of the input shaft, and a rotational speed of the output shaft, as well as based on the vehicle speed signal outputted from the vehicle speed detection system.

In a vehicle according to a second aspect of the invention, a rotational speed sensor detects a rotational speed of the driving source, the input shaft or the output shaft. The control unit detects an abnormality in the vehicle speed detection system when the rotational speed detected by the rotational speed sensor is equal to or higher than a predetermined rotational speed, and no vehicle speed signal has been substantially outputted from the vehicle speed detection system for a given period of time.

In a vehicle according to a third aspect of the invention, the rotational speed sensor detects a rotational speed of the driving source, the input shaft or the output shaft. The control unit detects an abnormality in the vehicle speed detection system when a value obtained by dividing the vehicle speed by the rotational speed detected by the rotational speed sensor, is equal to or smaller than a predetermined value for a given period of time.

A controller according to the invention detects an abnormality in the vehicle speed detection system based on at least one of a rotational speed of the driving source, a rotational speed of the input shaft, and a rotational speed of the output shaft, as well as based on the vehicle speed signal outputted from the vehicle speed detection system.

A method for detecting a vehicle abnormality according to the invention detects an abnormality in the vehicle speed detection system based on at least one of a rotational speed of the driving source, a rotational speed of the input shaft, and a rotational speed of the output shaft, as well as based on the vehicle speed signal outputted from the vehicle speed detection system.

The present invention enables early detection of an abnormality in a vehicle speed detection system of a vehicle having an ECVT.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiment 1

Overview of the Embodiment

The present inventors found, by studying conventional methods for detecting an abnormality, that early detection of an abnormality in a vehicle speed detection system of a vehicle having an ECVT is difficult. The inventors found that this difficulty is caused by defining a throttle opening as a condition for detecting an abnormality in the vehicle speed detection system, and made the present invention.

An abnormality in a vehicle speed detection system is detected according to the invention based on at least one of a rotational speed of a driving source, a rotational speed of an input shaft, and a rotational speed of an output shaft, as well as based on a vehicle speed signal outputted from the vehicle speed detection system. Specifically, if at least one of the rotational speed of the driving source, the rotational speed of the input shaft, and the rotational speed of the output shaft is equal to or higher than a predetermined rotational speed, and if no vehicle speed signal has been substantially outputted from the vehicle speed detection system for a given period of time, an abnormality in the vehicle speed detection system is detected.

This method detects an abnormality in the vehicle speed detection system independently of the throttle opening. Thus, the abnormality is detected at an early stage.

In the following description, the condition "the vehicle speed is substantially zero" refers to a speed at which a vehicle is substantially at a halt. In other words, the condition "the vehicle speed is substantially zero" refers to a speed at which a vehicle is not substantially running. An upper limit of the vehicle speed determined to "be substantially zero" may be preset as appropriate within a speed range of, for example, 10 km/h or less. In one embodiment, the condition "the vehicle speed is substantially zero" is defined as a detected vehicle speed of 5 km/h or less. In another embodiment, the condition "the vehicle speed is substantially zero" is defined as a detected vehicle speed of 2 km/h or less.

Figure 1:
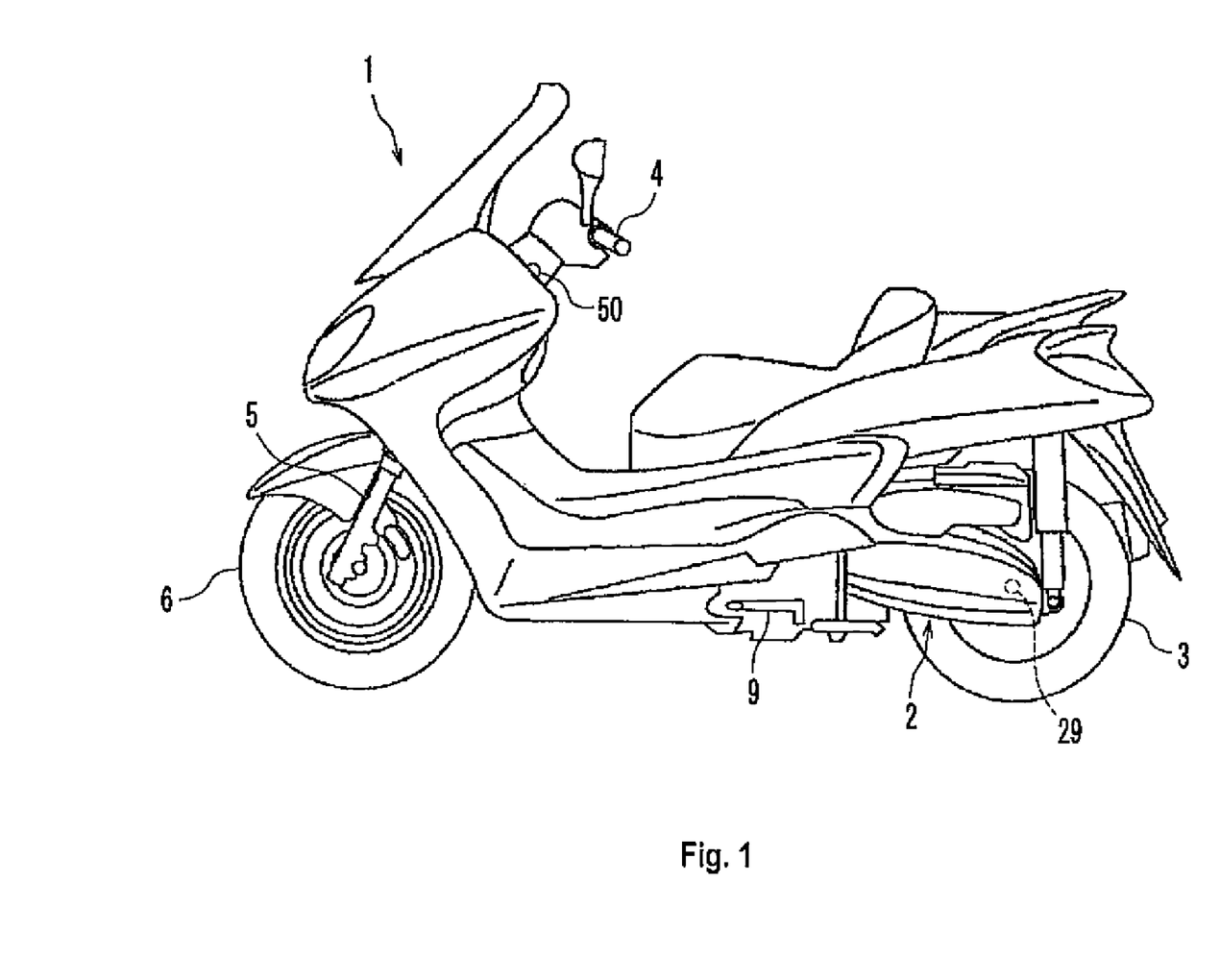
FIG. 1 is a side view of a two-wheeled motorized vehicle embodying the present invention.

An embodiment of the invention is described using a two-wheeled motorized vehicle 1 shown in FIG. 1 as an example. Vehicle 1 is a scooter-type two-wheeled motorized vehicle 1, however, the vehicle is not limited to a scooter-type vehicle and may be an off-road type, a motorcycle type or a moped vehicle. Also, the vehicle may be a straddle-type vehicle other than a two-wheeled motorized vehicle such as, for example, an all terrain vehicle (ATV). Further, the vehicle may be a vehicle other than a straddle type vehicle, such as a four-wheeled motorized vehicle.

<Detailed Description of Vehicle 1>

(General Construction of Vehicle 1)

FIG. 1 is a side view of vehicle 1, which has an engine unit 2 suspended from a body frame. A rear wheel 3 provided at a rear end of engine unit 2 is a drive wheel for driving a wheel with power outputted from engine unit 2.

A head pipe extends downward from steering handlebars 4. Front forks 5 are connected to a bottom end of the head pipe. A front wheel 6 rotatably attached to lower ends of front forks 5 is not connected to engine unit 2 and is a driven wheel.

A center stand 9 that holds vehicle 1 with the drive wheel or rear wheel 3 lifted off the ground is attached to the body frame.

A caution lamp 50 is provided at a location viewable by a rider seated on vehicle 1, such as a front panel of vehicle 1.

(Construction of Engine Unit 2)

The construction of engine unit 2 is described with reference to FIGS. 2 and 3.

—Construction of Engine 10—

Figure 2:
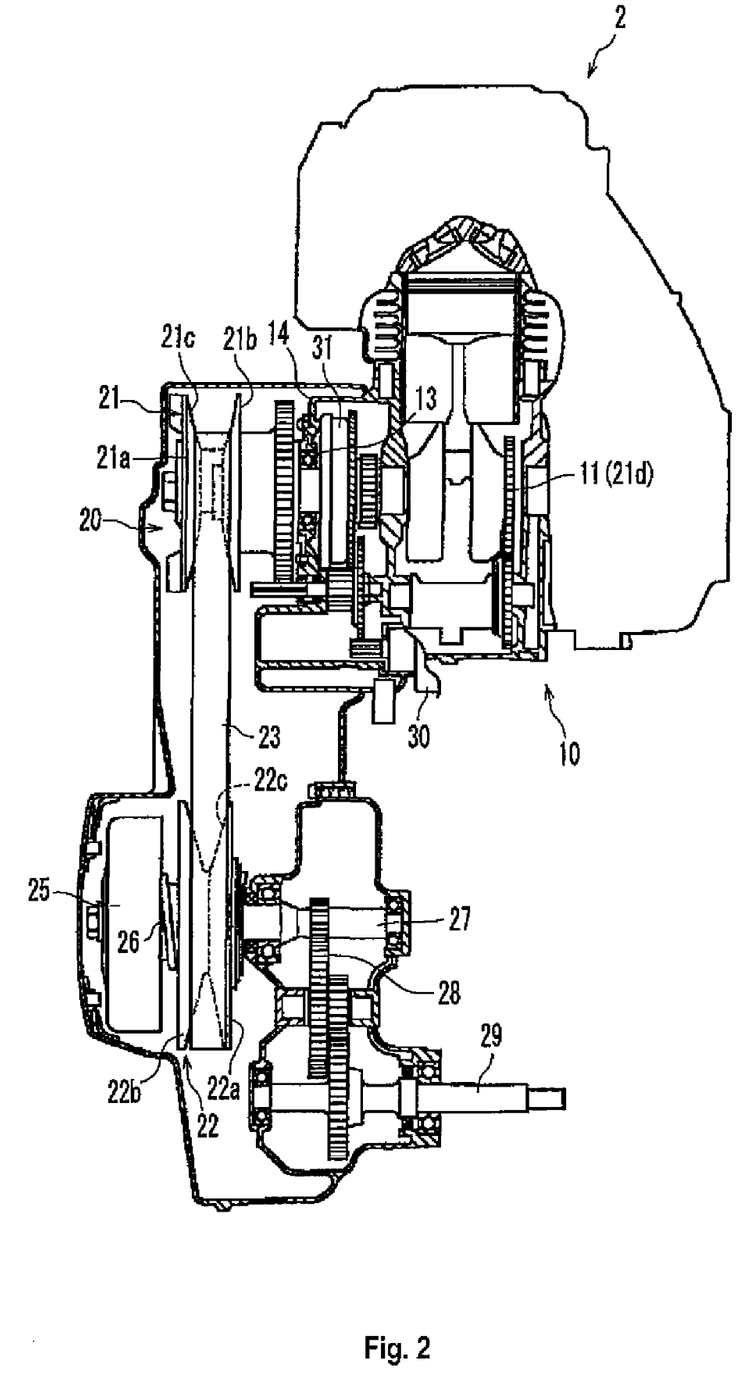
FIG. 2 is a sectional view of an engine unit of the vehicle.
Figure 3:
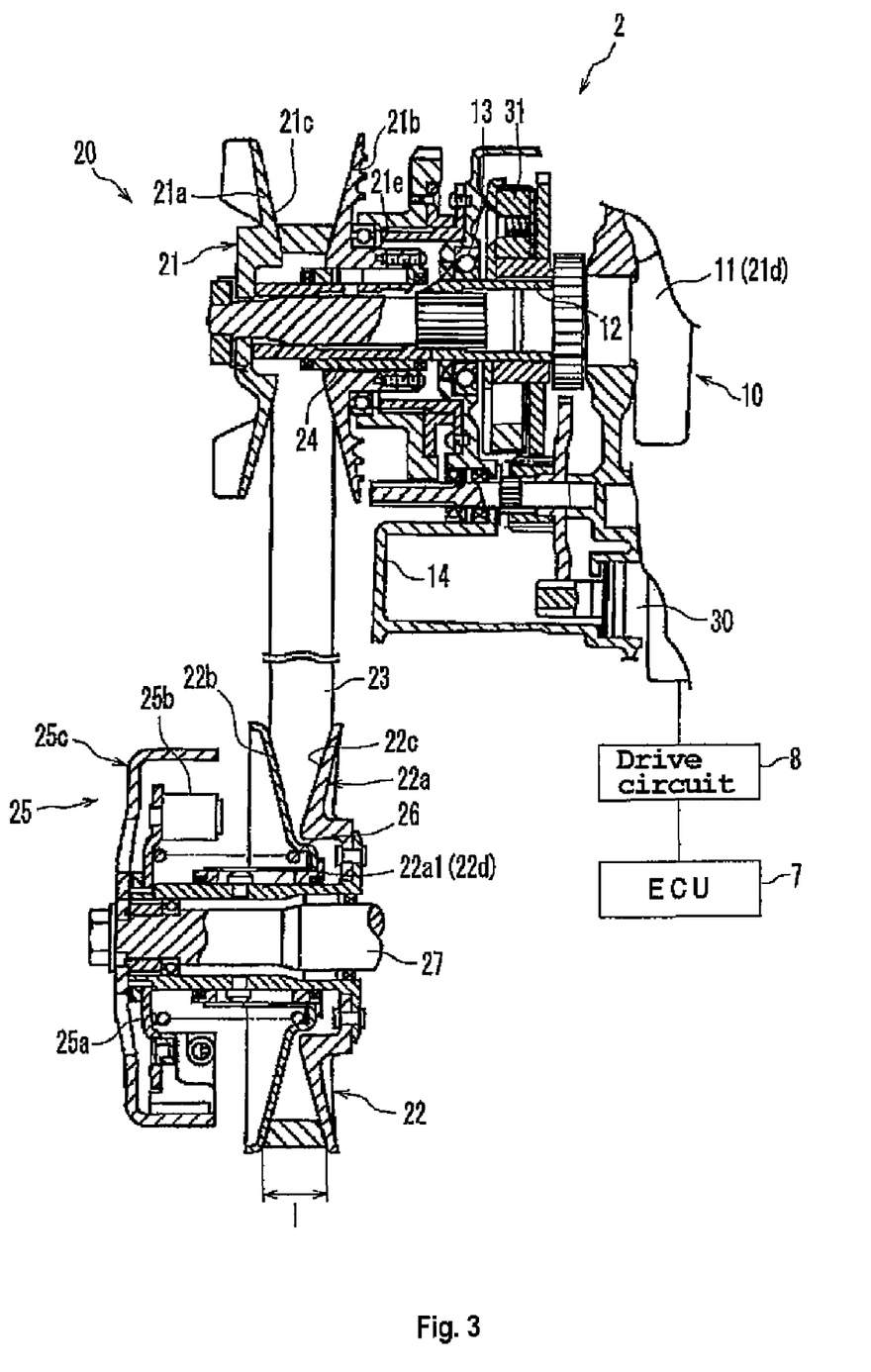
FIG. 3 is a partial sectional view illustrating an ECVT of the vehicle.

As shown in FIGS. 2 and 3, engine unit 2 has an internal combustion engine 10 for producing a rotational force and a continuously variable transmission 20. While engine 10 is described as a forced-air-cooled four-stroke engine, it may be another type of engine such as a water-cooled engine or a two-stroke engine. Engine 10 may be replaced with another driving source, such as an electric motor.

As shown in FIG. 3, engine 10 has a crankshaft 11. A sleeve 12 is spline-fitted onto an outer circumference of crankshaft 11 and rotatably supported by a housing 14 via a bearing 13. A one-way clutch 31 connected to a motor 30 is mounted onto an outer circumference of sleeve 12.

—Construction of Continuously Variable Transmission 20—

Continuously variable transmission (CVT) 20 includes a change-gear mechanism 20a, an electronic control unit (ECU) 7 as a control unit for controlling change-gear mechanism 20a and a drive circuit 8. While change-gear mechanism 20a is described as a belt-type ECVT, it is not limited to a belt-type ECVT and may be, for example, a toroidal type ECVT.

Change-gear mechanism 20a has a V-belt 23 wrapped around a primary sheave 21 and a secondary sheave 22. V-belt 23 is formed into an approximately V-shape in section and may be a rubber belt type, resin block belt type or the like.

Primary sheave 21 is connected to crankshaft 11 as an input shaft 21d and rotates together with crankshaft 11. Primary sheave 21 includes a fixed sheave half 21a fixed to one end of crankshaft 11 and a movable sheave half 21b opposed to fixed sheave half 21a. Movable sheave half 21b is movable in the axial direction of crankshaft 11. Opposing surfaces of fixed sheave half 21a and movable sheave half 21b form a belt groove 21c into which V-belt 23 is wrapped. Belt groove 21c is formed wider toward the radially outer side of primary sheave 21.

As shown in FIG. 3, movable sheave half 21b has a cylindrical boss 21e through which crankshaft 11 passes. A cylindrical slider 24 is fixed to an inner side of boss 21e. Movable sheave half 21b integral with slider 24 are movable in the axial direction of crankshaft 11. Accordingly, a width of belt groove 21c is variable.

The width of belt groove 21c is varied when motor 30 actuates movable sheave 21b in the axial direction of crankshaft 11. That is, CVT 20 is an ECVT in which the change-gear ratio is electronically controlled. In this embodiment, motor 30 is driven by pulse width modulation (PWM). However, the method for driving motor 30 is not limited to PAM. For example, motor 30 may be driven by pulse-amplitude modulation (PAM). Additionally, electric motor 30 may be a step motor type.

Secondary sheave 22 is located at the rear of primary sheave 21 and is mounted to a driven shaft 27 via a centrifugal clutch 25. Secondary sheave 22 includes a fixed sheave half 22a opposed to a movable sheave half 22b. A cylindrical portion 22a1 of fixed sheave half 22a forms an output shaft 22d of CVT 20. Fixed sheave half 22a is connected to driven shaft 27 via centrifugal clutch 25. Movable sheave half 22b is movable in the axial direction of driven shaft 27. Opposing surfaces of fixed sheave half 22a and movable sheave half 22b form a belt groove 22c into which V-belt 23 is wrapped. Belt groove 22c is formed wider toward the radially outer side of secondary sheave 22.

Movable sheave half 22b is urged by a spring 26 in a direction to decrease a width of belt groove 22c. In view of this, when motor 30 is driven, and the width of belt groove 21c decreases, a diameter with which V-belt 23 is wrapped around primary sheave 21 increases, while V-belt 23 on the side of secondary sheave 22 is pulled radially inward. Thus, movable sheave half 22b moves against the urging force of spring 26 in a direction to increase the width of belt groove 22c. Therefore, the diameter with which V-belt 23 is wrapped around secondary sheave 22 decreases to cause a change in a change-gear ratio of change-gear mechanism 20a.

Centrifugal clutch 25 is engaged or disengaged depending on a rotational speed of cylindrical portion 22a1 as output shaft 22d included in fixed sheave half 22a. That is, if the rotational speed of output shaft 22d is below a predetermined rotational speed, centrifugal clutch 25 is disengaged and rotation of fixed sheave half 22a is not transmitted to driven shaft 27. In contrast, if the rotational speed of output shaft 22d is equal to or higher than a predetermined rotational speed, centrifugal clutch 25 is engaged and rotation of fixed sheave half 22a is transmitted to driven shaft 27.

—Construction of Centrifugal Clutch 25—

As shown in FIG. 3, centrifugal clutch 25 includes a centrifugal plate 25a, a centrifugal weight 25b and a clutch housing 25c. Centrifugal plate 25a rotates together with fixed sheave half 22a. That is, centrifugal plate 25a rotates together with output shaft 22d. Centrifugal weight 25b is supported by centrifugal plate 25a such that it is displaceable in the radial direction of centrifugal plate 25a. Clutch housing 25c is fixed to one end of driven shaft 27. Driven shaft 27 is connected to an axle 29 via a deceleration mechanism 28. Rear wheel 3 is mounted to axle 29. Therefore, clutch housing 25c is connected to the drive wheel or rear wheel 3 via driven shaft 27, deceleration mechanism 28 and axle 29.

Clutch housing 25c engages with or disengages from centrifugal plate 25a depending on the rotational speed of output shaft 22d. If the rotational speed of output shaft 22d is equal to or higher than a predetermined rotational speed, centrifugal weight 25b uses a centrifugal force to move toward the radially outer side of centrifugal plate 25a to contact clutch housing 25c. This allows centrifugal plate 25a and clutch housing 25c to engage with each other such that rotation of output shaft 22d is transmitted to the drive wheel or rear wheel 3 through clutch housing 25c, driven shaft 27, deceleration mechanism 28 and axle 29. In contrast, if the rotational speed of output shaft 22d is below a predetermined rotational speed, the centrifugal force applied to centrifugal weight 25b decreases, so that centrifugal weight 25b moves away from clutch housing 25c. Therefore, rotation of output shaft 22d is not transmitted to clutch housing 25c and rear wheel 3 does not rotate.

(System for Controlling Vehicle 1)

A system for controlling vehicle 1 is now described with reference to FIG. 4.

—Overview of System for Controlling Vehicle 1—

Figure 4:
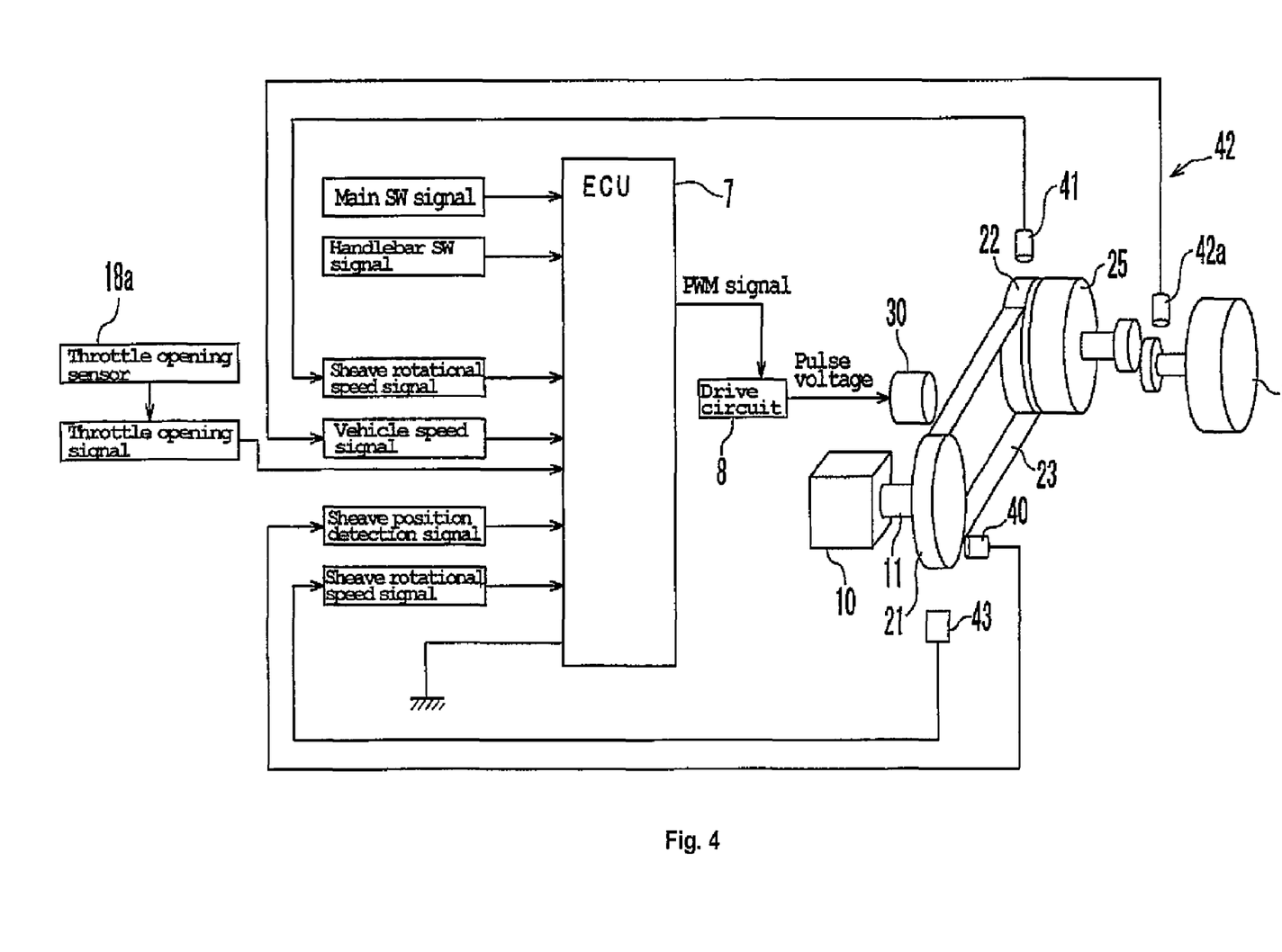
FIG. 4 is a block diagram of a system for controlling the vehicle.

As shown in FIG. 4, a sheave position sensor 40 connected to ECU 7 detects a position of movable sheave half 21b of primary sheave 21 relative to fixed sheave half 21a. In other words, sheave position sensor 40 detects a distance (I) between fixed sheave half 21a and movable sheave half 21b in the axial direction of crankshaft 11 and outputs the detected distance (I) to ECU 7 as a sheave position detection signal. Sheave position sensor 40 may comprise a potentiometer, for example.

In addition, a primary sheave rotation sensor 43, a secondary sheave rotation sensor 41 and a vehicle speed sensor 42a are connected to ECU 7. Primary sheave rotation sensor 43 detects a rotational speed of primary sheave 21 and outputs it to ECU 7. The rotational speed of primary sheave 21 is equal to the rotational speed of input shaft 21d of CVT 20 and is also equal to the rotational speed of engine 10 as a driving source. Thus, the rotational speeds of engine 10 and input shaft 21d are detected by primary sheave rotation sensor 43.

A secondary sheave rotation sensor 41 detects and outputs a rotational speed of secondary sheave 22 to ECU 7 as a sheave rotational speed signal. The rotational speed of secondary sheave 22 is equal to the rotational speed of output shaft 22d. Thus, secondary sheave rotation sensor 41 detects the rotational speed of output shaft 22d.

Vehicle speed sensor 42a detects a rotational speed of rear wheel 3 and outputs a vehicle speed signal to ECU 7 based on the detected rotational speed. In this embodiment, vehicle speed sensor 42a, the wiring for connecting vehicle speed sensor 42a and ECU 7 and the like form a vehicle speed detection system 42.

A handlebar switch attached to steering handlebars 4 is connected to ECU 7 and outputs a handlebar SW signal when operated.

As described above, a throttle opening sensor 18a outputs a throttle opening signal to ECU 7.

—Control of Change-Gear Mechanism 20a—

Figure 5:
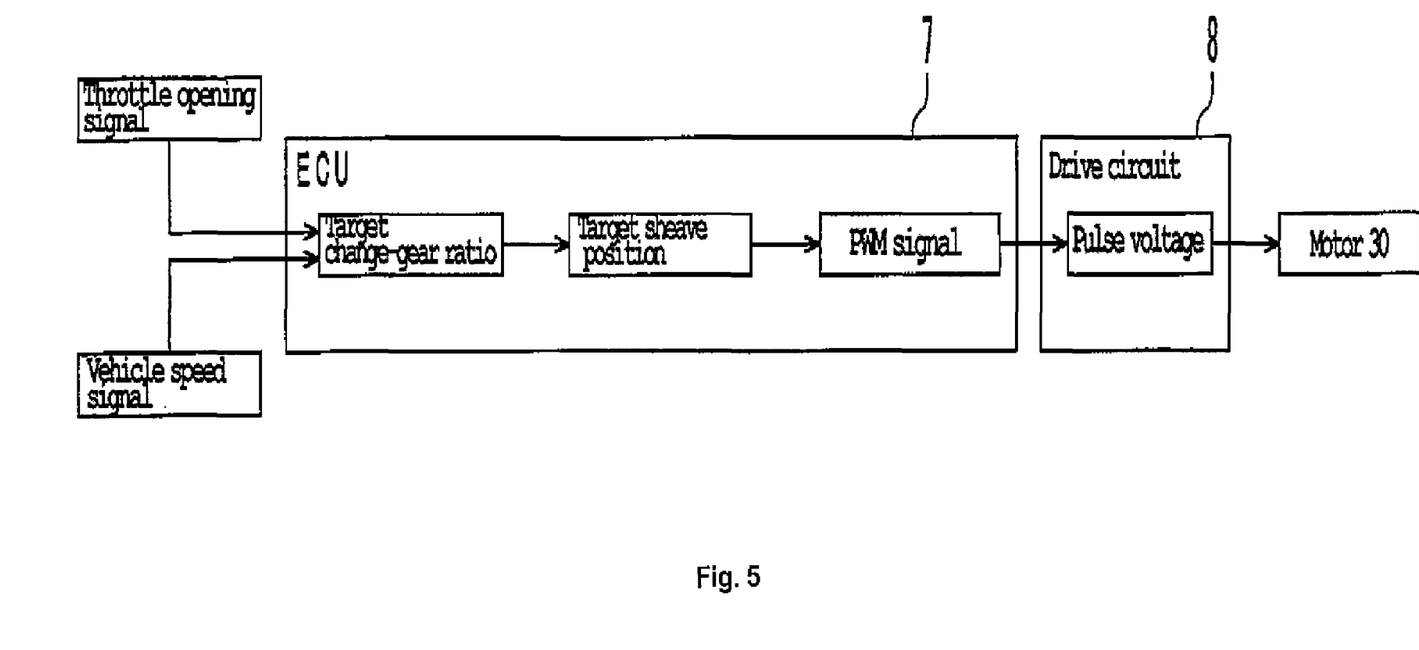
FIG. 5 is a block diagram illustrating sheave position control in the vehicle.

ECU 7 conducts feedback control of the sheave position of movable sheave half 21b of primary sheave 21 based on the vehicle speed signal and the like. In other words, ECU 7 conducts feedback control of the distance (I) based on the vehicle signal and the like.

Specifically, as shown in FIG. 5, ECU 7 determines a target change-gear ratio based on the throttle opening and vehicle speed, and calculates a target sheave position based on the determined target change-gear ratio. That is, ECU 7 calculates a target distance "I" between movable sheave half 21b and fixed sheave half 21a based on the determined target change-gear ratio. ECU 7 outputs a pulse-width modulation (PWM) signal to drive circuit 8 in accordance with the current position of movable sheave half 21b and the target sheave position in order to displace movable sheave half 21b to the target sheave position. Drive circuit 8 applies a pulse voltage to motor 30 in accordance with the PWM signal. Thereby, movable sheave half 21b is actuated to adjust the change-gear ratio.

—Determination of Abnormality in Vehicle Speed Detection System 42—

Figure 6:
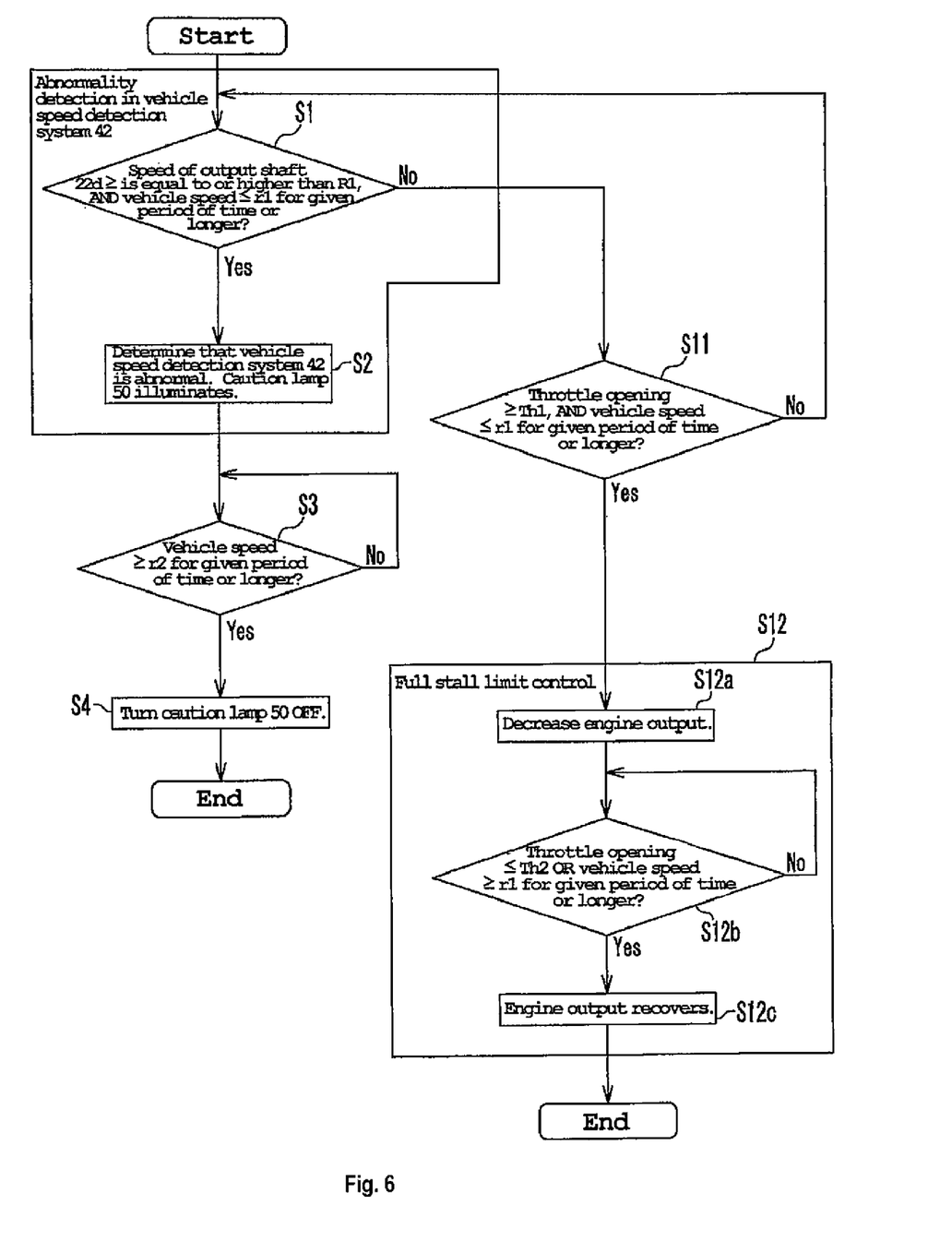
FIG. 6 is a flowchart illustrating a method for determining if an abnormality exists in a vehicle speed detection system and full stall limit control in the vehicle.

A method for determining if an abnormality exists in vehicle speed detection system 42 is described with reference to FIG. 6. As shown in FIG. 6, an abnormality in vehicle speed detection system 42 is detected based on the rotational speed of output shaft 22d detected by secondary sheave rotation sensor 41, and the vehicle speed signal outputted from vehicle speed detection system 42.

Step S1 determines whether the rotational speed of output shaft 22d is equal to or higher than a predetermined rotational speed $R_1$, and whether the vehicle speed signal, outputted from vehicle speed detection system 42 is equal to or lower than a predetermined speed $r_1$ for a given period of time or longer. In other words, it is determined whether no vehicle speed signal has been substantially outputted from vehicle speed detection system 42 for a given period of time or longer, even though output shaft 22d rotates at a certain speed or higher so that a vehicle speed signal should be outputted.

If the rotational speed of output shaft 22d is equal to or higher than predetermined rotational speed $R_1$, and the vehicle speed signal outputted from vehicle speed detection system 42 is equal to or lower than predetermined speed $r_1$ for a given period of time or longer, vehicle speed detection system 42 is determined to be abnormal and caution lamp 50 illuminates in step S2.

In step S1, the condition "the rotational speed of output shaft 22d is equal to or higher than a predetermined rotational speed $R_1$" is defined to determine whether the rotational speed of output shaft 22d is equal to or higher than a rotational speed such that a vehicle speed signal is outputted provided that no abnormality exists in vehicle speed detection system 42. Predetermined rotational speed $R_1$ may be set as appropriate, depending on the type of vehicle or the like. In this embodiment, centrifugal clutch 25 is located between output shaft 22d and the drive wheel or rear wheel 3. Therefore, predetermined rotational speed $R_1$ is preferably set at or higher than a rotational speed at which centrifugal clutch 25 is engaged.

In turn, predetermined speed $r_1$ is a speed at which no vehicle speed signal is substantially outputted from vehicle speed detection system 42. In other words, predetermined speed $r_1$ is a speed at which vehicle 1 is substantially at a halt. For example, predetermined speed $r_1$ may be set at 1-5 km/h.

The "given period of time" in step S1 may be set as appropriate, depending on the type of vehicle or the like. For example, the "given period of time" in step S1 may be set at approximately 1-10 seconds.

After step S2, a determination is made in step S3 whether the vehicle speed detected by vehicle speed detection system 42 is equal to or higher than a predetermined vehicle speed $r_2$ for a given period of time or longer. In other words, it is determined whether vehicle speed detection system 42 outputs a vehicle speed signal. If the detected vehicle speed is equal to or higher than predetermined vehicle speed $r_2$ for a given period of time or longer, vehicle speed detection system 42 is determined to be normal. Then, in step S4, caution lamp 50 is turned OFF. In contrast, if it is determined in step S3 that the vehicle speed detected by vehicle speed detection system 42 is not equal to or higher than predetermined vehicle speed $r_2$ for a given period of time or longer, vehicle speed detection system 42 is determined to be abnormal and the method returns to step S3.

Predetermined speed $r_2$ in step S3 is a value such that vehicle speed detection system 42 is determined to output a vehicle speed signal. Predetermined speed $r_2$ may be substantially equal to or different from predetermined speed $r_1$ in step S1. As with the given period of time in step S1, the given period of time in step S3 may be set as appropriate, depending on the type of vehicle or the like. For example, the "given period of time" in step S3 may be set at approximately 1-10 seconds.

In step S1 if the rotational speed of output shaft 22d is not equal to or higher than predetermined rotational speed $R_1$, and the vehicle speed signal outputted from vehicle speed detection system 42 is equal to or lower than predetermined speed $r_1$ for a given period of time or longer, vehicle speed detection system 42 is determined to be normal and the method goes to step S11.

Step S11 determines whether the throttle opening is equal to or greater than a predetermined opening $Th_1$, and whether the detected vehicle speed is equal to or lower than a predetermined speed $r_1$ for a given period of time or longer. That is, step S11 determines whether the vehicle speed detected by vehicle speed detection system 42 is equal to or lower than predetermined speed $r_1$ for a given period of time or longer, even though the throttle opening is equal to or greater than a predetermined opening $Th_1$, so that the vehicle speed should be higher than predetermined speed $r_1$. Thus, step S11 determines whether centrifugal clutch 25 is slipping due to some cause, so that no power is transmitted from engine 10 to the drive wheel or rear wheel 3. If centrifugal clutch 25 is determined to be slipping, full stall limit control is conducted in step S12. If centrifugal clutch 25 is not determined to be slipping, the method returns to step S1.

"Full stall limit control" refers to the condition in which the brake is applied to rear wheel 3 although the throttle is opened by the rider, in order to prevent centrifugal clutch 25 from continuing to slip. "Full stall limit control" prevents centrifugal weight 25b and clutch housing 25c of centrifugal clutch 25 from sliding with a large friction force and wearing out.

Predetermined speed $r_1$ in step S11 is equal to predetermined speed $r_1$ in step S1. Predetermined opening $Th_1$ may be set as appropriate, depending on the type of vehicle. As with the given period of time in step S1, the given period of time in step S11 is set as appropriate, depending on the type of vehicle or the like. For example, the "given period of time" in step S11 may be set at approximately 1-10 seconds.

In step S12, the output of engine 10 is decreased first as step S12a. For example, engine 10 may be stopped. The output of engine 10 may be decreased in any manner without restriction. For example, the output of engine 10 may be decreased by reducing the amount of fuel supplied to engine 10, or by retarding the ignition timing in engine 10.

Step S12b determines whether the throttle opening is equal to or smaller than a predetermined opening $Th_2$ or whether the vehicle speed is higher than a predetermined vehicle speed $r_1$ for a given period of time or longer. If the throttle opening is not equal to or smaller than $Th_2$ or the vehicle speed is not higher than predetermined vehicle speed $r_1$ for a given period of time or longer, the method returns to step S12b. That is, the output of engine 10 is kept decreased until the throttle opening is equal to or smaller than a predetermined opening $Th_2$ or the vehicle speed is higher than a predetermined vehicle speed $r_1$. In other words, the output of engine 10 is kept decreased until centrifugal clutch 25 is stopped from slipping. When the throttle opening is equal to or smaller than $Th_2$ or the vehicle speed is higher than a predetermined vehicle speed $r_1$ for a given period of time or longer, in step S12c, the output of engine 10 is caused to recover to the level before being decreased in step S12a.

Predetermined opening $Th_2$ in step S12b may be equal to or different from predetermined opening $Th_1$ in step S11, and predetermined speed $r_1$ in step S12b may be equal to or different from predetermined speed $r_1$ in step S1. As with the given period of time in step S1, the given period of time in step S12b is set as appropriate, depending on the type of vehicle or the like. For example, the "given period of time" in step S12b may be set at approximately 1-10 seconds.

<Function and Effect>

As described above, this embodiment of the invention does not include the throttle opening and the rate-of-change in rotational speed of engine 10 as a condition for detecting an abnormality in vehicle speed detection system 42. When the rotational speed of output shaft 22d (which equals the rotational speed of secondary sheave 22) detected by secondary sheave rotation sensor 41 is equal to or higher than a predetermined rotational speed $R_1$, and the vehicle speed detected by vehicle speed detection system 42 is equal to or lower than a predetermined speed $r_1$ for a given period of time or longer, an abnormality in vehicle speed detection system 42 is detected. In other words, when the rotational speed of output shaft 22d, detected by secondary sheave rotation sensor 41, is equal to or higher than a predetermined rotational speed $R_1$, and no vehicle speed signal has been substantially outputted from vehicle speed detection system 42 for a given period of time or longer, an abnormality in vehicle speed detection system 42 is detected. This allows earlier detection of an abnormality in vehicle speed detection system 42, compared to the conventional method.

In this embodiment, the vehicle speed is detected based on the rotational speed of the drive wheel or rear wheel 3. Thus, the vehicle speed is detected more accurately than, for example, a case where the vehicle speed is detected based on the rotational speed of the driven wheel or front wheel 6. This allows more accurate control of CVT 20.

In addition, because the vehicle speed is detected based on the rotational speed of the drive wheel or rear wheel 3, even when center stand 9 is used, an abnormality in vehicle speed detection system 42 is detectable. For example, when center stand 9 is used, front wheel 6 does not usually rotate. Thus, if vehicle speed sensor 42a is attached to the driven wheel or front wheel 6, vehicle speed sensor 42a cannot detect an abnormality in vehicle speed detection system 42. In contrast, rear wheel 3 rotates in accordance with the rotational speed of engine 10 even when center stand 9 is used, which allows abnormality detection in vehicle speed detection system 42.

In CVT 20, the change-gear ratio is changeable independently of the rotational speed of input shaft 21d. Thus, the rotational speed of output shaft 22d may not be high enough to cause centrifugal clutch 25 to be engaged, even though engine 10 and input shaft 21d rotate at high speeds. In such a case, using the rotational speed of engine 10 or the rotational speed of input shaft 21d to detect an abnormality in vehicle speed detection system 42 can possibly lead to misdetection of an abnormality in vehicle speed detection system 42 on the basis that centrifugal clutch 25 is disengaged, even though no abnormality actually exists in vehicle speed detection system 42. It is conceivable that not only the rotational speed of engine 10 and the rotational speed of input shaft 21d, but also the change-gear ratio of CVT 20 are monitored in order to prevent misdetection of an abnormality in vehicle speed detection system 42. However, this requires a larger number of sensors for controlling the CVT. This also complicates the control of the CVT and increases cost.

In contrast, in the embodiment of the invention, as a condition for detecting an abnormality in vehicle speed detection system 42 in step S1, the rotational speed of output shaft 22d, which decides if centrifugal clutch 25 is engaged or disengaged, is defined as equal to or higher than a rotational speed $R_1$. Rotational speed $R_1$ is preset equal to or higher than a rotational speed at which centrifugal clutch 25 is engaged. Thus, when centrifugal clutch 25 is disengaged and rear wheel 3 is not substantially driven, no abnormality in vehicle speed detection system 42 is detected. Therefore, there is no possibility of misdetection of an abnormality in vehicle speed detection system 42 only on the basis that centrifugal clutch 25 is disengaged. Consequently, an abnormality in vehicle speed detection system 42 is detected more accurately.

That is, when using the rotational speed of engine 10 or the rotational speed of input shaft 21d to detect an abnormality in vehicle speed detection system 42, the change-gear ratio of CVT 20 needs to be considered for abnormality detection in vehicle speed detection system 42. However, when using the rotational speed of output shaft 22d to detect an abnormality in vehicle speed detection system 42, an abnormality in vehicle speed detection system 42 is detected more accurately without considering the change-gear ratio of CVT 20.

To prevent misdetection of an abnormality in vehicle speed detection system 42, rotational speed $R_1$ may be any value as long as rotational speed $R_1$ is equal to or higher than a rotational speed at which centrifugal clutch 25 is engaged. However, for reliable and early detection of an abnormality in vehicle speed detection system 42, rotational speed $R_1$ is preferably equal to a rotational speed at which centrifugal clutch 25 is engaged. Thereby, immediately after the rotational speed of output shaft 22d reaches the rotational speed at which centrifugal clutch 25 is engaged, an abnormality in vehicle speed detection system 42 is detectable.

In this embodiment, when an abnormality in vehicle speed detection system 42 is detected, caution lamp 50 illuminates. This allows the rider to be informed of an abnormality in vehicle speed detection system 42 at an early stage. For example, caution lamp 50 may flash to be easily recognizable.

Incidentally, it is conceivable that an abnormality in vehicle speed detection system 42 can temporally exist due to poor contact of the wiring for connecting vehicle speed sensor 42a and ECU 7. In this embodiment, after an abnormality in vehicle speed detection system 42 is detected, when vehicle speed detection system 42 is determined to have recovered to a normal state in step S3, caution lamp 50 is turned OFF. Thus, the rider is informed immediately after vehicle speed detection system 42 has recovered from a temporary abnormal state to a normal state.

In this embodiment, after vehicle speed detection system 42 is determined to be normal in step S1, if certain conditions in step S11 are satisfied, full stall limit control is conducted in step S12 to prevent centrifugal clutch 25 from wearing out. Specifically, clutch housing 25c and centrifugal weight 25b are prevented from sliding each other and wearing out, thereby increasing the service life of centrifugal weight 25b.

In this embodiment, full stall limit control in step S12 is conducted after vehicle speed detection system 42 is determined to be normal in step S11. Thus, full stall limit control is conducted properly.

When centrifugal clutch 25 is stopped from slipping through step S12b and step S12c, the output of engine 10 recovers to a level that allows normal driving.

For example, it is conceivable that step S1 is skipped, and in step S11, an abnormality in vehicle speed detection system 42 is detected in addition to detection of a slippage of centrifugal clutch 25. That is, it is conceivable that step S1 is skipped, and if the determination is made in step S11 that the throttle opening is equal to or greater than a predetermined opening $Th_1$, and the vehicle speed, detected by vehicle speed detection system 42, is equal to or lower than a predetermined vehicle speed $r_1$, then an abnormality in vehicle speed detection system 42 is detected in addition to detection of a slippage of centrifugal clutch 25. However, in such a case, a slippage of centrifugal clutch 25 and an abnormality in vehicle speed detection system 42 are undesirably detected at the same time. Thus, the rider cannot clearly recognize which of the abnormality in vehicle speed detection system 42 or the slippage of centrifugal clutch 25 causes a decrease in output of engine 10.

In contrast, in this embodiment of the invention, after a determination is made whether an abnormality exists in vehicle speed detection system 42 in step S1, step S11 is performed. That is, slippage of centrifugal clutch 25 and the abnormality in vehicle speed detection system 42 are individually detected in separate processes. This allows the rider to surely determine if an abnormality exists in vehicle speed detection system 42.

Embodiment 2

Figure 7:
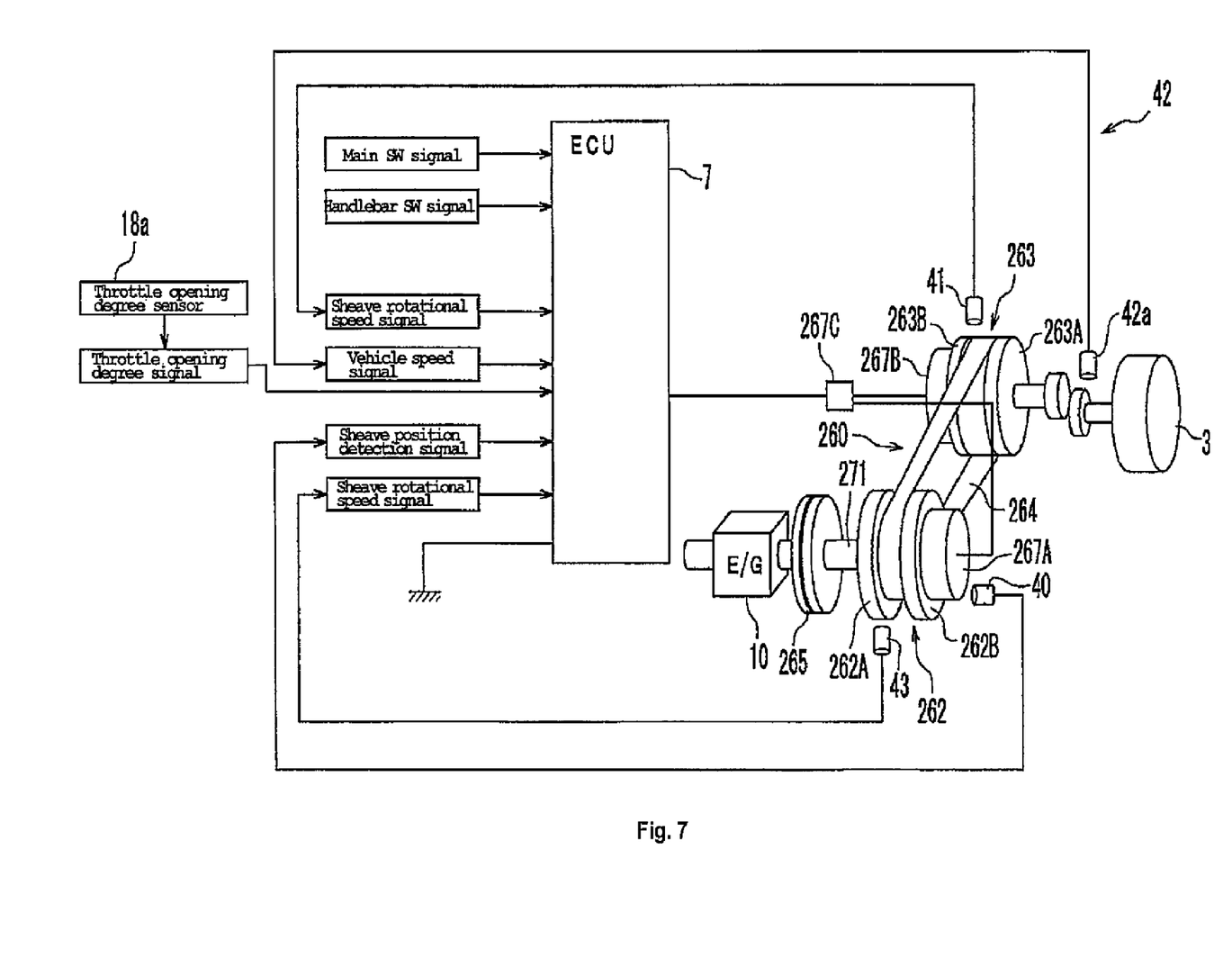
FIG. 7 is a block diagram illustrating a control system in accordance with a second embodiment of the invention.

FIG. 7 is a block diagram of a system for controlling a two-wheeled motorized vehicle in accordance with a second embodiment of the invention (embodiment 2). In embodiment 2, variable transmission 260 is a belt type ECVT having a so-called metal belt 264.

The actuator of ECVT in embodiment 1 is electric motor 30. However, the actuator of ECVT is not limited to electric motor 30. The actuator of ECVT in embodiment 2, for example, is a hydraulic actuator.

In embodiment 1, the clutch is a centrifugal clutch 25 that is located between output shaft 22d of variable transmission 20 and rear (drive) wheel 3 and mechanically engaged or disengaged depending on the rotational speed of output shaft 22d. However, the clutch in embodiment 2 is located between engine 10 and input shaft 271 of variable transmission 260 and controlled to be engaged or disengaged depending on the rotational speed of engine 10. Specifically, in embodiment 2, electrically controlled multiple friction clutch 265 is used as a clutch.

As shown in FIG. 7, the vehicle of embodiment 2 includes electrically controlled multiple friction clutch 265 and ECVT type variable transmission 260. Variable transmission 260 includes a metal belt 264 wound around a primary sheave 262 and a secondary sheave 263. Primary sheave 262 includes fixed sheave half 262A and movable sheave half 262B. Secondary sheave 263 includes fixed sheave half 263A and movable sheave half 263B.

A primary sheave rotation sensor 43 is equipped to primary sheave 262. A secondary sheave rotation sensor 41 is equipped to secondary sheave 263.

The vehicle includes as a hydraulic actuator a hydraulic control valve 267C connected to hydraulic cylinders 267A and 267B. Hydraulic cylinder 267A adjusts the groove width of primary sheave 262 by driving movable sheave half 262B of primary sheave 262. Hydraulic cylinder 267B adjusts the groove width of secondary sheave 263 by driving movable sheave half 263B of secondary sheave 263. Hydraulic control valve 267C adjusts the hydraulic pressure applied to hydraulic cylinders 267A and 267B. Hydraulic control valve 267C controls hydraulic cylinders 267A and 267B so that when the hydraulic pressure of one of hydraulic cylinders 267A and 267B becomes high, the hydraulic pressure of the other one becomes low. Hydraulic control valve 267C is controlled by ECU 7.

Multiple friction clutch 265 is located between engine 10 and input shaft 271 of variable transmission 260, and controlled to be engaged or disengaged depending on the rotational speed of engine 10 (hereafter referred to as "engine speed"). For example, multiple friction clutch 265 is controlled to be engaged when the engine speed exceeds the predetermined value and disengaged when the engine speed is below the predetermined value.

The control of embodiment 1 is also performed in embodiment 2. Generally, the abnormality determination of embodiment 1 is also performed in embodiment 2. In embodiment 1, predetermined rotational speed $R_1$ of output shaft 22d (see step S1 in FIG. 6.) is for example set to the rotational speed at which centrifugal clutch 25 is engaged or higher. Similarly, in embodiment 2, predetermined rotational speed $R_1$ is preferably set to the rotational speed at which clutch 265 is engaged or higher. Also in embodiment 2, the slipping clutch determination of clutch 265 is performed in step S11. If clutch 265 is determined as slipping, full stall limit control is preferably performed.

Embodiment 2 obtains the same effect as in embodiment 1.

<<Other Variations>>

The vehicle in the invention is not limited to a scooter-type vehicle and may be an off-road type, a motorcycle type, a scooter type or a moped type vehicle. Also, the vehicle may be a straddle-type vehicle other than a two-wheeled motorized vehicle such as an all terrain vehicle (ATV). Further, the vehicle may be a vehicle other than a straddle type vehicle such as a four-wheeled motorized vehicle.

Change-gear mechanism 20a is not limited to a belt-type ECVT. For example, change-gear mechanism 20a may be a toroidal type ECVT or an electronically-controlled change-gear mechanism other than an ECVT.

Input shaft 21d of CVT 20 may be directly connected to engine 10 as a driving source, as described in embodiment 1. Alternatively, input shaft 21d may be indirectly connected to engine 10 via another member.

As described in embodiment 1, output shaft 22d of CVT 20 may be indirectly connected to rear (drive) wheel 3 via driven shaft 27, deceleration mechanism 28, axle 29 and the like. Alternatively, output shaft 22d may be directly connected to the drive wheel or rear wheel 3.

An example has been described in which an abnormality in vehicle speed detection system 42 is detected based on the rotational speed of secondary sheave 22, which is detected by secondary sheave rotation sensor 41, and based on the vehicle speed signal, which is outputted from vehicle speed detection system 42. However, the invention is not limited to this. For example, instead of the rotational speed of secondary sheave 22, the rotational speed of engine 10 or the rotational speed of the input shaft may be used as a criterion for detecting an abnormality in vehicle speed detection system 42. Alternatively, at least two values from the rotational speed of engine 10, the rotational speed of the input shaft and the rotational speed of the output shaft may be used as a criterion for detecting an abnormality in vehicle speed detection system 42. In addition, the rotational speed of the output shaft may be calculated, for example, by multiplying the rotational speed of engine 10 or the rotational speed of the input shaft by the change-gear ratio.

In addition, in embodiment 1, step S1 determines whether the rotational speed of secondary sheave 22 is equal to or higher than a predetermined rotational speed $R_1$, and the vehicle speed is equal to or lower than $r_1$ for a given time period or longer. However, a different condition may be employed. That is, a value obtained by dividing any one of the rotational speed of engine 10, the rotational speed of input shaft 21d, and the rotational speed of output shaft 22d by the vehicle speed, is equal to or smaller than a predetermined value. Specifically, a condition that a value obtained by dividing the rotational speed of secondary sheave 22 by the vehicle speed, is equal to or smaller than a predetermined value, may be employed.

In this embodiment of the invention, an example is described in which when an abnormality in vehicle speed detection system 42 is detected, caution lamp 50 illuminates. Alternatively, caution lamp 50 may flash when an abnormality is detected.

The driving source is not limited to an engine. For example, the driving source may be an electric motor.

In this embodiment of the invention, after the output of engine 10 is decreased in step S12a, the output of engine 10 is recovered in step S12c. Alternatively, engine 10 may be stopped in step S12a and steps S12b and S12c skipped.

In this embodiment of the invention, in steps S11 and S12b, the slipping centrifugal clutch 25 is detected based on the throttle opening and vehicle speed. Alternatively, for example, in place of the condition that the throttle opening is equal to or greater than a predetermined opening $Th_1$, a different condition may be defined, such as, an amount of fuel supplied to engine 10 is equal to or larger than a predetermined amount. Alternatively, the condition that the throttle opening is equal to or greater than a predetermined opening $Th_1$ may be replaced with a condition that the ignition timing in engine 10 is more advanced than a predetermined ignition timing.

A clutch regulated by an actuator or the like may be provided in place of centrifugal clutch 25 such that the clutch is engaged or disengaged in accordance with a detection value of the rotational speed of engine 10.

<<Definition of Terms in the Specification>>

The condition "the vehicle speed is substantially zero" refers to a speed at which a vehicle is substantially at a halt. In other words, a speed at which a vehicle is not substantially running. An upper limit of the vehicle speed determined to "be substantially zero" may be preset as appropriate within, for example, a speed range of 10 km/h or lower. In one embodiment, the condition "the vehicle speed is substantially zero" is defined as a speed detected by the vehicle speed detection system of 5 km/h or lower. In another embodiment, the condition "the vehicle speed is substantially zero" is defined as a speed detected by the vehicle speed detection system of 2 km/h or lower.

The term "be connected" means both directly connected and indirectly connected via other members.

The term "vehicle speed detection system" refers to an entire mechanism for detecting a vehicle speed. In this embodiment, the "vehicle speed detection system" includes vehicle speed sensor 42a for detecting a vehicle speed, ECU 7, and the wiring (not shown) for connecting vehicle speed sensor 42a and ECU 7.

The expression "the output of the engine is decreased" also means that the engine is stopped.

The term "slipping centrifugal clutch" means that two engaged/disengaged clutch members are sliding. In this embodiment, this means that clutch housing 25c and centrifugal weight 25b are sliding.

The condition "the centrifugal clutch is engaged" may or may not include half-clutch state, depending on the vehicle applying the invention.

The present invention is useful for a vehicle with an ECVT mounted.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A vehicle comprising:
a drive wheel;
a driving source for producing a rotational force;
a continuously variable transmission having an input shaft connected to the driving source and an output shaft indirectly connected to the drive wheel, in which a change-gear ratio between the input shaft and the output shaft is electronically controlled;
a vehicle speed detection system having a vehicle speed sensor for detecting a rotational speed of the drive wheel and outputting a vehicle speed signal in accordance with the detected rotational speed of the drive wheel; and
a control unit for detecting an abnormality in the vehicle speed detection system based on at least one of a rotational speed of the driving source, a rotational speed of the input shaft, and a rotational speed of the output shaft that is different from the rotational speed of the drive wheel, as well as based on the vehicle speed signal outputted from the vehicle speed detection system.

2. The vehicle according to claim 1, further comprising:
a rotational speed sensor for detecting the rotational speed of the driving source, the input shaft or the output shaft, wherein the control unit detects the abnormality in the vehicle speed detection system when the rotational speed detected by the rotational speed sensor is equal to or higher than a predetermined rotational speed, and no vehicle speed signal has been substantially outputted from the vehicle speed detection system for a given period of time.

3. The vehicle according to claim 2, further comprising a clutch located between the output shaft and the drive wheel that is engaged or disengaged depending on the rotational speed of the output shaft, wherein the rotational speed sensor detects the rotational speed of the output shaft, and the predetermined rotational speed is a rotational speed at which the clutch is engaged.

4. The vehicle according to claim 2, further comprising a clutch located between the driving source and the input shaft that is engaged or disengaged depending on the rotational speed of the driving source, wherein the rotational speed sensor detects the rotational speed of the output shaft, and the predetermined rotational speed is a rotational speed at which the clutch is engaged.

5. The vehicle according to claim 1, further comprising:
a rotational speed sensor for detecting the rotational speed of the driving source, the input shaft or the output shaft, wherein the control unit detects the abnormality in the vehicle speed detection system when a value obtained by dividing a vehicle speed determined from the vehicle speed signal by the rotational speed detected by the rotational speed sensor, is equal to or smaller than a predetermined value for a given period of time.

6. The vehicle according to claim 1, further comprising a stand for lifting the drive wheel off the ground.

7. The vehicle according to claim 1, further comprising a caution lamp that is illuminated or flashed by the control unit when the abnormality is detected in the vehicle speed detection system.

8. The vehicle according to claim 1, wherein after detecting the abnormality in the vehicle speed detection system, the control unit detects that the vehicle speed detection system is returned to normal based on the vehicle speed signal outputted from the vehicle speed detection system.

9. The vehicle according to claim 1, further comprising a clutch located between the output shaft and the drive wheel.

10. The vehicle according to claim 1, further wherein the control unit detects the abnormality based on the rotational speed of the output shaft.

11. A vehicle comprising:
a drive wheel;
a driving source for producing a rotational force;
a continuously variable transmission having an input shaft connected to the driving source and an output shaft connected to the drive wheel, in which a change-gear ratio between the input shaft and the output shaft is electronically controlled;
a vehicle speed for outputting a vehicle speed signal;
a control unit for detecting an abnormality in the vehicle speed detection system based on at least one of a rotational speed of the driving source, a rotational speed of the input shaft, and a rotational speed of the output shaft, as well as based on the vehicle speed signal outputted from the vehicle speed detection system; and
a clutch located between the output shaft and the drive wheel, wherein after detecting the abnormality in the vehicle speed detection system, the control unit decreases an output of the driving source if a slippage of the clutch is detected.

12. The vehicle according to claim 11, wherein the clutch is engaged or disengaged depending on the rotational speed of the output shaft, and the control unit decreases the output of the driving source only if the rotational speed of the output shaft is equal to or higher than a rotational speed at which the clutch is engaged.

13. The vehicle according to claim 11, further comprising a throttle to control the output of the driving source, wherein the control unit detects the slippage of the clutch if the vehicle speed is equal to or lower than a predetermined vehicle speed, and a throttle opening is equal to or greater than a predetermined opening for a given period of time.

14. The vehicle according to claim 11, further comprising a throttle to control the output of the driving source, wherein the control unit causes the output of the driving source to recover, after detecting the slippage of the clutch, if the throttle opening is equal to or smaller than the predetermined opening or if the vehicle speed is higher than the predetermined vehicle speed.

15. A vehicle comprising:
a drive wheel;
a driving source for producing a rotational force;
a continuously variable transmission having an input shaft connected to the driving source and an output shaft connected to the drive wheel, in which a change-gear ratio between the input shaft and the output shaft is electronically controlled;
a vehicle speed detection system for outputting a vehicle speed signal;
a control unit for detecting an abnormality in the vehicle speed detection system based on at least one of a rotational speed of the driving source, a rotational speed of the input shaft, and a rotational speed of the output shaft, as well as based on the vehicle speed signal outputted from the vehicle speed detection system; and
a clutch located between the driving source and the input shaft, wherein after detecting the abnormality in the vehicle speed detection system, the control unit decreases an output of the driving source if a slippage of the clutch is detected.

16. The vehicle according to claim 15, wherein the clutch is engaged or disengaged depending on the rotational speed of the output shaft, and the control unit decreases the output of the driving source only if the rotational speed of the driving source is equal to or higher than a rotational speed at which the clutch is engaged.

17. The vehicle according to claim 15, further comprising a throttle to control the output of the driving source, wherein the control unit detects the slippage of the clutch if the vehicle speed is equal to or lower than a predetermined vehicle speed, and the throttle opening is kept equal to or greater than a predetermined opening for a given period of time.

18. The vehicle according to claim 15, further comprising a throttle to control the output of the driving source, wherein after detecting the slippage of the clutch, the control unit causes the output of the driving source to recover if the throttle opening is equal to or smaller than the predetermined opening or the vehicle speed is higher than the predetermined vehicle speed.

19. A controller for a vehicle having a drive wheel, a driving source for producing a rotational force, a continuously variable transmission having an input shaft connected to the driving source and an output shaft indirectly connected to the drive wheel, in which a change-gear ratio between the input shaft and the output shaft is electronically controlled and a vehicle speed detection system having a vehicle speed sensor for detecting a rotational speed of the drive wheel and outputting a vehicle speed signal in accordance with the detected rotational speed of the drive wheel the controller comprising:
a determiner arranged to determine whether at least one of a rotational speed of the driving source, a rotational speed of the input shaft, and a rotational speed of the output shaft that is different from the rotational speed of the drive wheel, is equal to or higher than a predetermined rotational speed, and no vehicle speed signal has been substantially outputted from the vehicle speed detection system for a given period of time; and
a detector arranged to detect an abnormality in the vehicle speed detection system when the determiner determines that the determined rotational speed is equal to or higher than the predetermined rotational speed, and no vehicle speed signal has been substantially outputted from the vehicle speed detection system for the given period of time.

20. A method of detecting an abnormality in a vehicle having a drive wheel, a driving source for producing a rotational force, a continuously variable transmission having an input shaft connected to the driving source and an output shaft indirectly connected to the drive wheel, in which a change-gear ratio between the input shaft and the output shaft is electronically controlled, and a vehicle speed detection system having a vehicle speed sensor for detecting a rotational speed of the drive wheel and outputting a vehicle speed signal in accordance with the detected rotational speed of the drive wheel, the method comprising:
detecting an abnormality in the vehicle speed detection system based on at least one of a rotational speed of the driving source, a rotational speed of the input shaft, and a rotational speed of the output shaft that is different from the rotational speed of the drive wheel, and also based on the vehicle speed signal outputted from the vehicle speed detection system.

21. A controller for a vehicle that includes a drive wheel, a driving source for producing a rotational force, a continuously variable transmission having an input shaft connected to the driving source and an output shaft indirectly connected to the drive wheel, in which a change-gear ratio between the input shaft and the output shaft is electronically controlled and a vehicle speed detection system having a vehicle speed sensor for detecting a rotational speed of the drive wheel and outputting a vehicle speed signal in accordance with the detected rotational speed of the drive wheel, the controller comprising:
a determiner that determines whether a value obtained by dividing a vehicle speed determined from the vehicle speed signal by a rotational speed of the driving source, a rotational speed of the input shaft, or a rotational speed of the output shaft that is different from the rotational speed of the drive wheel, is equal to or smaller than a predetermined value for a given period of time; and
a detector arranged to detect an abnormality in the vehicle speed detection system when the determiner determines that the value is equal to or smaller than the predetermined value for the given period of time.

* * * * *